Jan. 8, 1963  L. A. LEIFER  3,072,416
FORCE AMPLIFYING COLLET CHUCK
Filed May 31, 1961
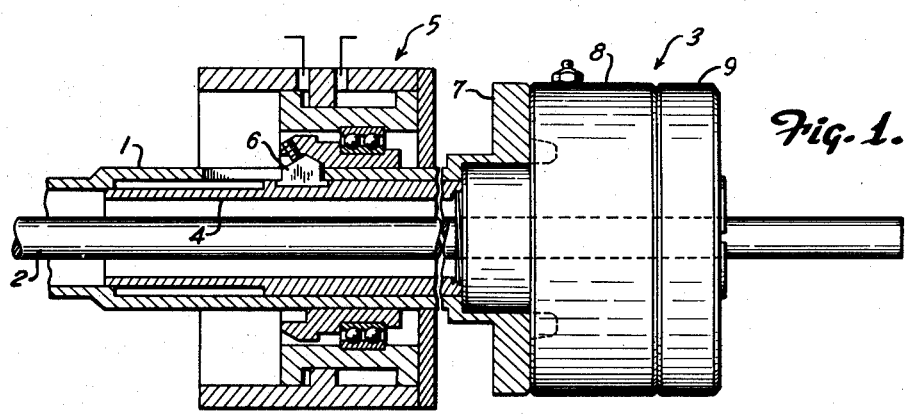
Fig. 1.
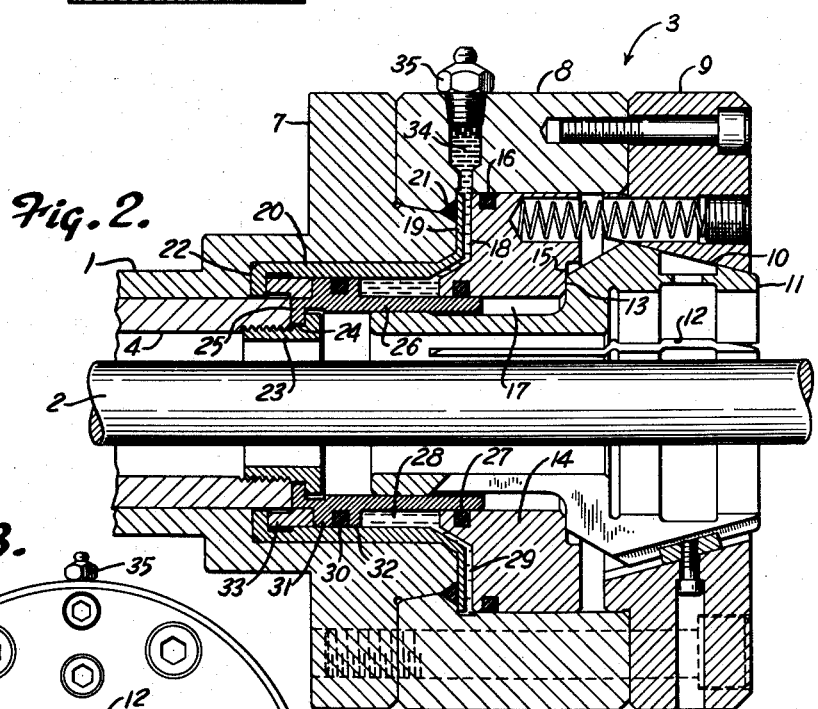
Fig. 2.
Fig. 3.
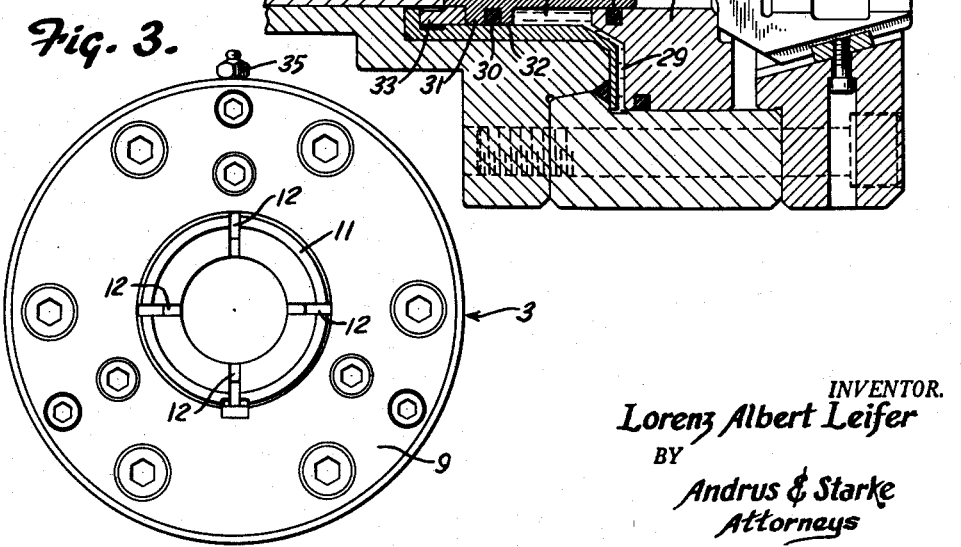
INVENTOR.
Lorenz Albert Leifer
BY
Andrus & Starke
Attorneys

United States Patent Office 3,072,416
Patented Jan. 8, 1963

3,072,416
FORCE AMPLIFYING COLLET CHUCK
Lorenz A. Leifer, Madison, Wis., assignor to Gisholt Machine Company, Madison, Wis., a corporation of Wisconsin
Filed May 31, 1961, Ser. No. 113,756
1 Claim. (Cl. 279—4)

This invention relates to a force amplifying collet chuck, and more particularly to a collet chuck for bar stock gripping and the like.

In turret and similar lathes, a workpiece is chucked on and rotated by a spindle while a tool is controllably moved to machine metal from the rotating piece.

In certain types of lathes, a draw sleeve is associated with the spindle and is slidably actuated to control the chucking function. In some lathes, the draw sleeve is pneumatically or hydraulically actuated in a longitudinal direction and in turn operates a two, three or four jaw chuck through a mechanical linkage system. Such chucks are normally utilized for gripping castings or forgings for performing such operations as turning, facing or boring.

The type of chucking indicated above may require a longitudinal force to actuate the jaws of about 5000 to 6000 lbs., and a stroke of about 1½ inches. Many machines are designed so that the draw sleeve actuator will provide this force and stroke.

It is sometimes desirable to utilize a machine generally similar to that described above for machining of tube and bar stock. This requires a different type of chucking apparatus generally known as a collet chuck. In this type of chuck a longitudinal stroke of the push tube or draw sleeve is not over ¼ inch, but the force necessary for adequate gripping is much greater. Whereas a 5000 lb. longitudinal force is deemed adequate for normal jaw chuck actuation, a collet chuck requires 6 to 10 times as much, i.e., 30,000 to 50,000 lbs.

Heretofore, in order to convert a machine from one utilizing low chucking force to one using a much higher force, not only the chuck had to be changed, but also the entire draw sleeve and its actuating mechanism. Consequently, an entirely different machine was usually utilized.

The present invention solves the aforementioned difficulties, and provides a structure wherein the change in chucking pressure is provided at the chuck itself. The draw sleeve and its associated mechanism remains unchanged regardless of the chucking force required. The same basic machine may therefore be used for both kinds of machining operations.

In accordance with the invention, the chuck itself amplifies the forces transmitted to it from the draw sleeve, this being accomplished in a novel manner.

The accompanying drawings illustrate the best mode presently contemplated by the inventor for carrying out the invention.

In the drawings:

FIGURE 1 is a side elevation of the apparatus of the invention with the chuck actuating mechanism in vertical section;

FIG. 2 is an enlarged vertical section of the chuck; and

FIG. 3 is an end view of the chuck.

The collet chuck of the invention may be utilized in connection with a turret lathe of the type shown in my United States Patent 2,948,542. This patent should be referred to for details of construction of the spindle and its motive force, as well as a draw sleeve actuating mechanism.

As shown schematically, the lathe headstock carries a spindle 1 for rotation therein, which is adapted to receive therethrough a workpiece 2 of tube or bar stock for machining. The workpiece is adapted to be clamped in position by the collet chuck 3. A draw sleeve 4 is disposed concentrically between spindle 1 and workpiece 2 at the forward end of the headstock. Chucking and unchucking forces are applied to draw sleeve 4 by an hydraulic mechanism 5 through a thrust block 6.

The forward end of spindle 1 is provided with an outwardly extending radial flange 7 to which is bolted the main annular body 8 of chuck 3. An annular collet head 9 is bolted to the outer face of body 8 and includes a conical inner surface 10 adapted to slidingly receive a collet 11. Body 8 and head 9 form the chuck housing.

Collet 11 comprises a thin-walled hollow, flexible steel member having a forward portion of enlarged diameter which rides on surface 10 and which is separated into springable, jaw-like segments by suitable longitudinal slots 12. The rearward sleeve portion of collet 11 is cylindrical and of reduced diameter, and forms at the joint with the forward portion thereof an annular shoulder or face 13.

Collet 11 is disposed for longitudinal sliding movement for clamping workpiece 2 just outwardly of head 9. For this purpose, an annular pusher member 14 of generally heavy construction is disposed directly behind face 13 and has a forward face 15 for engaging face 13. The outer circumferential surface of pusher 14 is adapted to slide longitudinally on the annular inner surface of body 8, and an O-ring 16 is provided therebetween for sealing purposes.

The inner circumferential surface of pusher 14 is generally concentric with the cylindrical rearward portion of collet 11 and spaced slightly therefrom to form an annular space 17, for purposes to be described.

The rearward face 18 of pusher 14 is disposed closely adjacent the outwardly extending flange or base portion 19 of a cap-like cylindrical liner 20. The annular edge of base portion 19 is sealed as by an O-ring 21 in the V-shaped space between body 8 and the nose of spindle 1.

The rearward end of liner 20 is flanged inwardly at 22 to form a bearing surface for the end portion of draw sleeve 4 which slides therethrough. The forward end of draw sleeve 4 is threaded internally for receiving a a threaded lock ring 23, the latter having an annular portion 24 at its forward end for receiving the inwardly flanged rear end portion 25 of a generally cylindrical thrust sleeve 26.

The forward end of sleeve 26 is received for sliding within space 17. An O-ring 27 seals the space between pusher 14 and the sleeve.

Sleeve 26 is spaced radially inwardly from liner 20 to form a chamber 28, the latter continuing forwardly to join with a small space 29 between face 18 of pusher 14 and base 19.

The rearward end of chamber 28 is sealed by an O-ring 30 disposed in a groove formed by a pair of spaced annular walls 31 and 32 extending radially outwardly from the rear end portion of thrust sleeve 26.

Rearward wall 31 may be spaced from flange 22 by a spacer ring 33 if desired.

Chamber 28 and space 29 are completely filled with a viscous fluid 34 having a high bulk modulus and being substantially incompressible. Examples of such fluids are: a low viscosity silicone fluid, or a gelatinous epoxy compound. The fluid may be introduced in any suitable manner, such as through an opening normally closed by a Zerk fitting 35.

In operation of the device, as draw sleeve 4 moves forward, it will carry thrust sleeve 26 with it. Forward movement of the latter is permitted by space 17. Front wall 32 acts as a piston against fluid 34 and as sleeve 26 moves the forces will be transmitted through the fluid to the piston-like face 18 of pusher 14 to move the latter against shoulder 13. This will slide collet 11 forward to clamp the workpiece.

The inner edge of face 18 has approximately the same radius as the inner edge of wall 32, but extends radially outwardly much farther. In the instance shown, the area subtended by face 18 is about eight times that of wall 32. In accordance therewith, the forward movement of pusher 14 will only be about one-eighth as much as that of thrust sleeve 26. By the same token, since the force applied increases as the square of the effective radius, the force at face 18 will be about eight times that at wall 32. This greater force is applied directly to the collet 11.

The apparatus of the invention provides a self-contained collet chuck which hydraulically amplifies the force applied to it. The power source may be of low force type. The chuck may easily be removed and replaced with other mechanism requiring only low operating forces.

Various modes of carrying out the invention are contemplated as being within the scope of the following claim particularly pointing out and distinctly claiming the subject matter which is regarded as the invention.

I claim:

A collet chuck for use with a lathe having a hollow rotatable spindle and a longitudinally actuatable hollow draw sleeve concentrically disposed therewithin, said chuck comprising:

(a) an annular chuck housing adapted for securement to the spindle and having a conical inner surface at its forward end, (b) an annular collet slideable within said housing and having a plurality of forwardly disposed work-engaging jaws slideable on said conical inner surface and also having a rearwardly extending sleeve portion of reduced diameter, (1) the portion of said collet joining said jaws and said sleeve portion forming a rearwardly facing annular shoulder, (c) a longitudinally slideable annular pusher member disposed rearwardly of said shoulder and having a surface adapted to engage the latter to clamp the jaws to the work, (1) the rear face of said pusher member forming the forward piston end of a housing chamber adapted to contain relatively incompressible fluid, (2) and the inner circumferential surface of said pusher member being disposed radially outwardly from said sleeve portion to form an annular space, (d) and a thrust sleeve slideable in said annular space and extending rearwardly for securement to the draw sleeve, (1) said thrust sleeve having an annular wall extending radially outwardly therefrom rearwardly of said pusher member and forming the rearward piston end of said chamber, (e) the rearward piston end formed by said wall being of lesser area than the forward piston end formed by said pusher member so that thrust transmitted by the draw sleeve will be amplified by said pusher member as it moves said collet forwardly.

References Cited in the file of this patent

UNITED STATES PATENTS

| | | |
|---|---|---|
| 2,462,155 | Benjamin | Feb. 22, 1949 |
| 2,676,810 | Landreth | Apr. 27, 1954 |
| 2,873,121 | Hahn | Feb. 10, 1959 |
| 2,889,150 | Goldring | June 2, 1959 |
| 2,911,222 | Eve | Nov. 3, 1959 |